United States Patent [19]

Kurachi et al.

[11] Patent Number: 5,396,324
[45] Date of Patent: Mar. 7, 1995

[54] LENS METER FOR MEASURING A REFRACTIVE POWER OF A LENS

[75] Inventors: Mikio Kurachi, Aichi; Noritsugu Nozawa, Toyokawa; Yasuhisa Murakami, Anjo, all of Japan

[73] Assignee: Nidek Co., Ltd., Gamagori, Japan

[21] Appl. No.: 267,297

[22] Filed: Jun. 29, 1994

Related U.S. Application Data

[63] Continuation of Ser. No. 969,696, Oct. 28, 1992, abandoned.

[30] Foreign Application Priority Data

Nov. 30, 1991 [JP] Japan ................................. 3-342185
Dec. 28, 1991 [JP] Japan ............................. 3-113508 U

[51] Int. Cl.⁶ .............................................. G01B 9/00
[52] U.S. Cl. ...................................... 356/124; 356/127
[58] Field of Search ............................... 356/124–127;
250/201.3; 351/204, 208, 211, 212, 214, 218, 219, 221; 359/368, 385, 388

[56] References Cited

U.S. PATENT DOCUMENTS

| | | | |
|---|---|---|---|
| 2,723,594 | 11/1955 | Lueck | 356/124 |
| 4,123,163 | 10/1978 | Chace et al. | 356/125 |
| 4,149,801 | 4/1979 | Volk | 356/124 |
| 4,247,200 | 1/1981 | Nohda et al. | 356/124 |
| 4,410,267 | 10/1983 | Shindow et al. | 356/124 |
| 4,564,291 | 1/1986 | Yoshino et al. | 356/125 |

Primary Examiner—Hoa Q. Pham
Attorney, Agent, or Firm—Nikaido, Marmelstein, Murray & Oram

[57] ABSTRACT

A lens meter including an illumination light source for illuminating a measurement target, a target projection optical system for projecting the measurement target onto an inspected lens, an observation optical system for observing a focused state of the projected target image and target moving device for moving the measurement target in an optical axis direction or the like to thereby measure a refracting power of the inspected lens on the basis of an amount in which the measurement target is moved in the optical axis direction. This lens meter includes a lens holder for holding the inspected lens substantially parallel to a plane on which the lens meter is installed, and a reflection system optical element for reflecting a measurement light passed through the inspected lens even times so that the measurement light is introduced into the observation optical system.

7 Claims, 5 Drawing Sheets

LENS METER FOR MEASURING A REFRACTIVE POWER OF A LENS

This application is a continuation of application Ser. No. 07/969,696, filed Oct. 28, 1992, now abandoned.

FIELD OF THE INVENTION

The present invention relates to a lens meter for measuring a refractive power of a lens to be inspected.

BACKGROUND OF THE INVENTION

Conventional lens meters of ocular type operate to measure a refractive power of an inspected lens by moving a measurement target such that it is focused on a scale plate while observing a measurement target image projected onto the inspected lens through an observation optical system thereof.

In this type of lens meter, optical axes of a measurement optical system and an observation optical system are made coincident with each other. The optical axis of the optical system is inclined relative to a plane on which the lens meter is installed. This optical axis is rotatable in a range from 0 to 90 degrees.

The conventional lens meter is provided at its different positions with two knobs, i.e., a power adjustment knob for moving the measurement target in the optical axis direction and an axis adjustment knob for rotating the measurement target. Thus, a sphere power, a cylinder power, a cylinder axis or the like can be measured by operating the above two knobs of the lens meter.

Other conventional lens meters include a so-called auto-off timer circuit. At the same time when a power switch of the lens meter is turned on, the auto-off timer circuit is automatically actuated and then turns off the power switch of the lens meter after a set time was passed.

The above lens meter needs a wide plane on which it is installed so that it can be made stable at any angle from 0 to 90 degrees at which the optical axis of the optical system is inclined. However, since a workshop of an optician who needs such a lens meter is generally small, the conventional lens meter that requires a wide installment area is not desirable.

Further, if the optical axis of the optical system is rotated nearly 90 degrees, there is then the disadvantage such that the inspector cannot see a marking device and a lens table substantially.

Furthermore, according to the above conventional lens meters, the inspector must operate the knobs while observing the measurement target image through the ocular tube. Accordingly, if the inspector measures an cylinder lens which forces the inspector to operate both the power adjustment knob and axis adjustment knob is measured, there is then the disadvantage such that the inspector has to make his eye off from the ocular tube each time the inspector confirms the position of the knob or that the inspector has to feel the knobs while observing the measurement target image through the ocular tube.

In addition, according to the above conventional lens meter with the auto-off timer circuit in which the auto-off timer circuit is actuated at the same time when the lens meter starts to operate, the power switch is turned off after a predetermined time was passed since the lens meter has been actuated. Accordingly, when several lenses are continuously measured or lenses such as a progressive addition lens that needs a long measurement time are measured, there is then the risk that the power switch of such lens meter is suddenly turned off during the measurement. To remove such risk as much as possible, a time set by the auto-off timer circuit must be extended, which unavoidably loses the auto-off function substantially.

SUMMARY OF THE INVENTION

Accordingly, it is an object of the present invention to provide a lens meter which can solve the aforesaid problems encountered with the prior-art lens meters.

More specifically, it is an object of the present invention to provide a lens meter which can reduce an area in which the lens meter is installed.

It is another object of the present invention to provide a lens meter which is easy to handle.

According to an aspect of the present invention, there is provided a lens meter which includes an illumination light source for illuminating a measurement target, a target projection optical system for projecting the measurement target onto an inspected lens, an observation optical system for observing a focused state of the projected target image and target moving device for moving the measurement target in an optical axis direction or the like to thereby measure a refracting power of the inspected lens on the basis of an amount in which the measurement target is moved in the optical axis direction. This lens meter comprises a lens holder for holding the inspected lens in substantially parallel to a plane on which the lens meter is installed, and a reflection system optical element for reflecting a measurement light passed through the inspected lens even times so that the measurement light is introduced into the observation optical system.

BRIEF DESCRIPTION OF THE DRAWINGS

A better understanding of other objects, features, and advantages of the invention can be gained from a consideration of the following detailed description of an illustrative embodiment thereof, in conjunction with the figures of the accompanying drawings, wherein.

DESCRIPTION OF THE PREFERRED EMBODIMENT

A lens meter apparatus according to an embodiment of the present invention will hereinafter be described with reference to the drawings.

Figure 1:
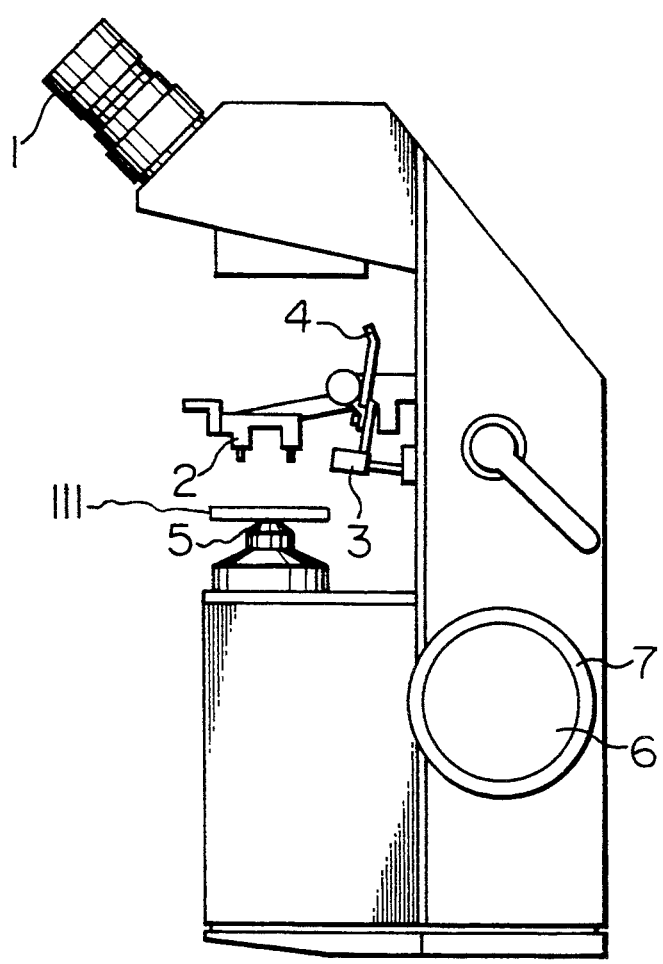
FIG. 1 is a side view showing an overall arrangement of a lens meter apparatus according to an embodiment of the present invention.

As shown in FIG. 1 of the accompanying drawings, a lens meter according to the present invention includes an ocular tube 1 through which the inspector observes an inspected lens 111, a lens support 2, a marking device 3, a marking device knob 4 for operating the marking device 3, a lens holder 5 for holding thereon an inspected lens 111, a power adjustment knob 6 for adjusting a refractive power by moving a target (described later on) in the optical axis direction and an axis adjustment knob 7 for adjusting the axis by rotating the target.

A measurement optical system of the lens meter apparatus of the present invention is constructed as follows.

Figure 2:
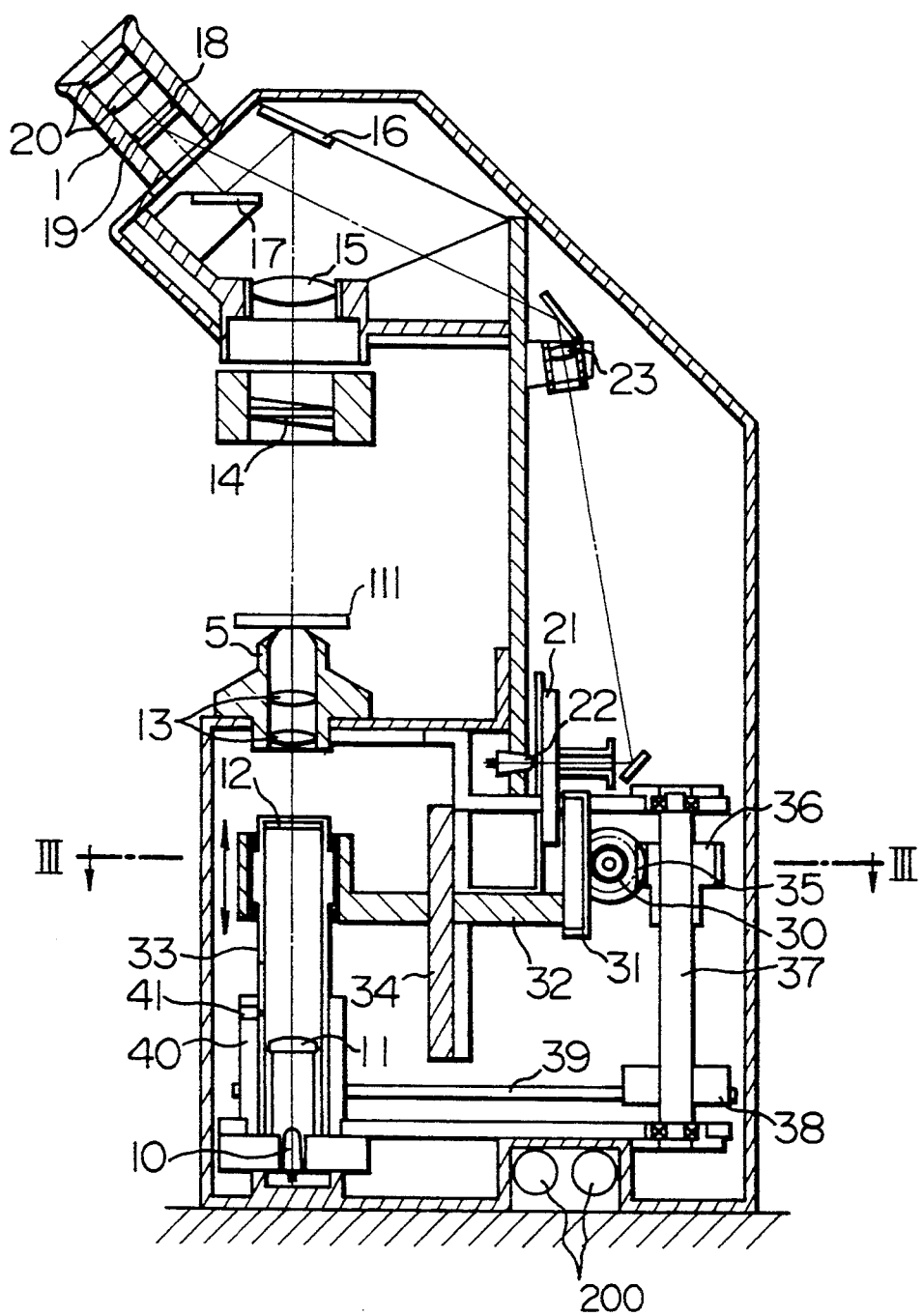
FIG. 2 is a side view showing a structure of an optical system of the lens meter apparatus of FIG. 1 in a fragmentarily cross-sectional fashion.

In FIG. 2 of the accompanying drawings, reference numeral 10 depicts a target illuminating source (lamp) LED. A light from the lamp 10 is converged and substantially collimated by a condenser lens 11 to illuminate a target 12. The target 12 is made movable on and rotatable about the optical axis by a mechanism that will be described later on. The target 12 is adjusted such that, when the inspected lens 111 is 0 diopter, it is located at the object focal point of a collimating lens 13. An optical axis of a target projection optical system which comprises the lamp 10, the condenser lens 11, the target 12 and the collimating lens 13 is disposed in the direction substantially perpendicular to the plane on which the lens meter apparatus is installed. The top portion of the lens holder 5 is in substantially conjugation with the LED 10.

In FIG. 2, reference numeral 14 depicts a prism compensator, 15 an objective lens, and 16, 17 mirrors. The mirrors 16, 17 are adapted to change an optical path of a measurement light beam which perpendicularly travels from the plane on which the lens meter apparatus is installed so that the measurement light beam is introduced into the observation optical system. By reflecting the above measurement light beam even times with the mirrors 16, 17, it is possible to prevent an observation image from being inverted.

An index plate 18 has a reticle marked thereon and a scale plate 19 has angles calibrated thereon. The inspector observes an image of the target 12 projected onto the index plate 18 and the scale plate 19 through an eyepiece 20. The observation optical system is inclined by an inclination angle between 30 to 60 degrees relative to the target projection optical system. While an optical axis of the observation optical system is inclined at 45 degrees relative to the target projection optical system, this optical system of the observation optical system can be arbitrarily inclined by varying inclination angles of the mirrors 16, 17.

A scale plate 21 includes a fixed index to indicate a measured refractive power. The scale plate 21 is coupled to the direction in which the target 12 is moved in the optical axis direction. The scale plate 21 is illuminated with a lamp 22. An image on the scale plate 21 is focused on a peripheral portion of the index plate 18 by means of an relay lens 23.

Figure 3:
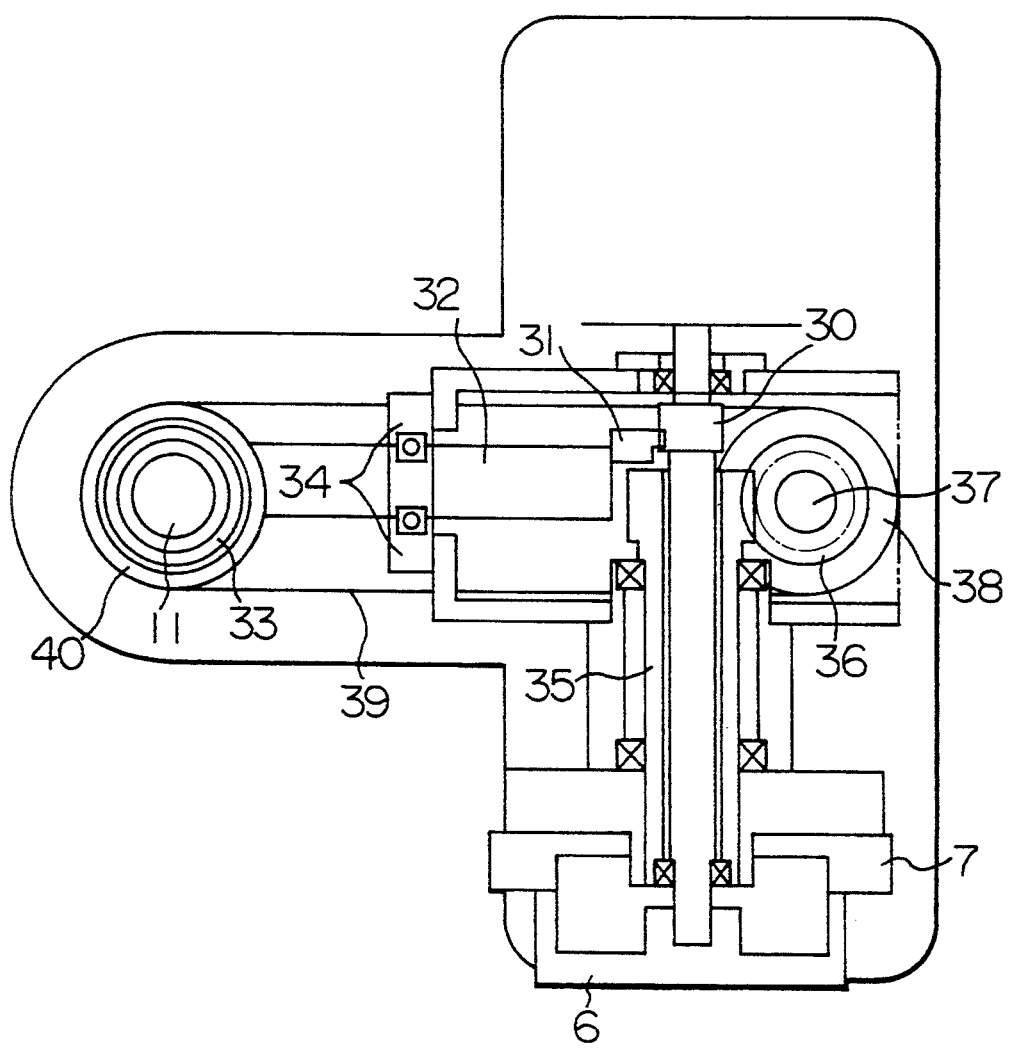
FIG. 3 is a cross-sectional view taken along the line III—III in FIG. 2.

A target drive mechanism composed of the power adjustment knob 6 and the axis adjustment knob 7 will be described below with reference to also FIG. 3 of the accompanying drawings.

As illustrated, the power adjustment knob 6 and the axis adjustment knob 7 are disposed coaxially with each other. When the power adjustment knob 6 is turned, a pinion 30 is rotated and a rack 31 is moved in the upper and lower direction. The rack 31 is formed as one body with a movement support base 32 and the movement support base 32 holds the target 12 and a holding tube 33 thereof such that they become rotatable. A movement guide 34 enables the movement support base 32 to smoothly move in the upper and lower direction. In this way, the target 12 is moved upwardly or downwardly by the rotation of the power adjustment knob 6.

When the axis adjustment knob 7 is turned, a screw gear shaft 35 is rotated to rotate a screw gear 36. The screw gear 36 is fixed to a shaft 37 and a pulley 38 also is fixed to the shaft 37 so that the shaft 37 and the pulley 38 are rotated by the rotation of the screw gear 36. A rotation of the pulley 38 is transmitted to a pulley 40 by means of a belt 39. A rotation of the pulley 40 is transmitted to the holding tube 33 by a pin 41 to rotate the target 12, thereby effecting the axis adjustment.

An auto-off function of the lens meter apparatus will be described with reference to a block diagram forming FIG. 4.

Figure 4:
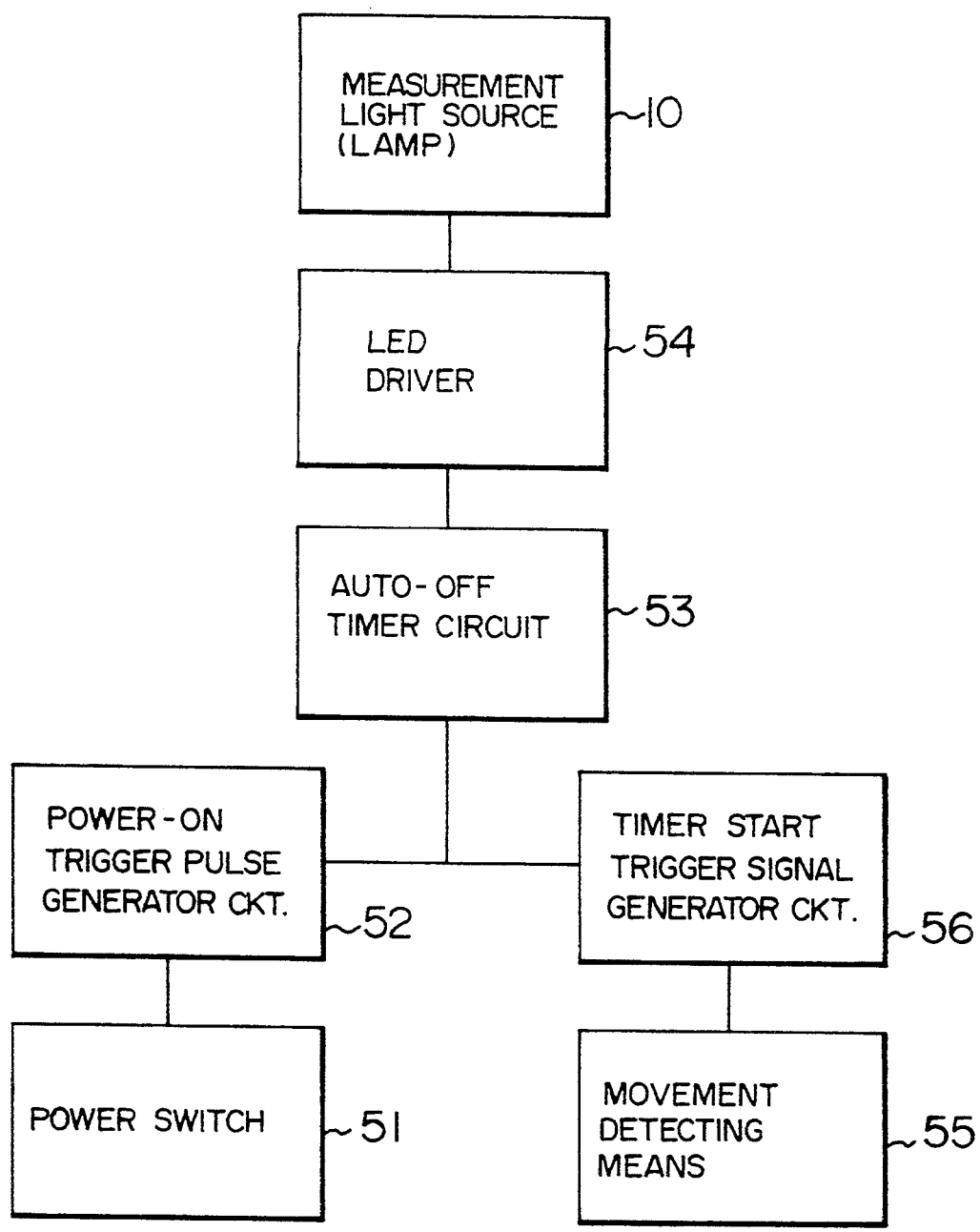
FIG. 4 is a block diagram used to explain an auto-off function of the lens meter apparatus according to the present invention.

Referring to FIG. 4, when a power switch 51 of the lens meter apparatus is turned on, a power-on trigger pulse generator circuit 52 outputs a trigger pulse to an auto-off timer circuit 53. The trigger pulse is input to the auto-off timer circuit 53 as a timer start trigger signal to actuate the auto-off timer circuit 53. Thus, a light emitting diode (LED) driver 54 energizes the measurement light source (lamp) 10 by battery 200. If the power switch 51 remains turned on, then the measurement light source (lamp) 10 is turned off after a set time (T) set by the auto-off timer circuit 53 was passed.

Figure 5:
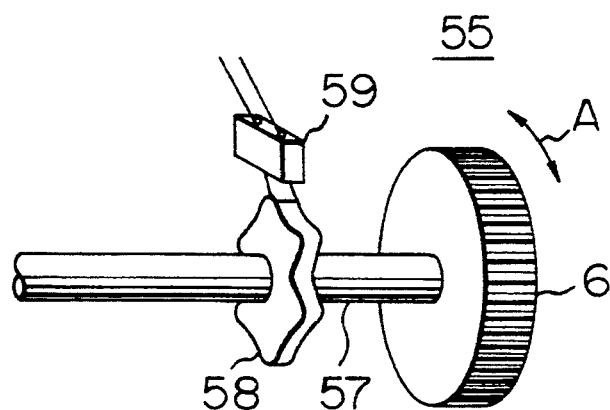
FIG. 5 is a perspective view schematically showing an example of a movement detecting means according to the present invention.

If the power adjustment knob 6 is operated when the measurement light source (lamp) 10 is energized under the condition such that the power switch 51 is in its on-state, then a detected signal from the movement detecting means 55 of the power adjustment knob 6 is input to a timer start trigger signal generator circuit 56. The movement detecting means 55 is schematically illustrated in FIG. 5 of the accompanying drawings. As shown in FIG. 5, the power adjustment knob 6 includes a shaft 57 on which there is disposed a plate 58 of petal-like configuration whose radius is changed periodically. An outer circumference of the plate 58 is brought in contact with a detection member of a micro-switch 59 so that, when the power adjustment knob 6 is rotated a predetermined amount in the direction shown by an arrow A, the micro-switch 59 is turned on or off.

The timer start trigger signal generator circuit 56 generates a timer start trigger signal in response to a leading edge of the signal from the micro-switch 59. The timer start trigger signal is input to the auto-off timer circuit 53, whereby the auto-off timer circuit 53 is reset and then started again. Thereafter, insofar as the power adjustment knob 6 is not operated, the measurement light source lamp 10 is turned off by the set time (T) of the auto-off timer circuit 53. The auto-off timer circuit 53 may be freely reset by operating the power adjustment knob 6.

Figure 6:
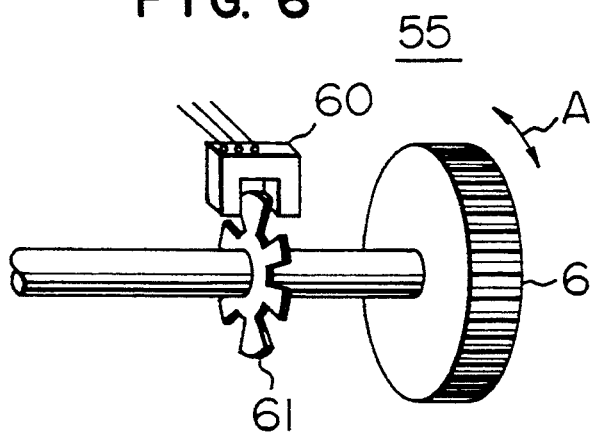
FIG. 6 is a perspective view schematically showing another example of the movement detecting means according to the present invention.

FIG. 6 of the accompanying drawings shows another example of the movement detecting means 55.

As shown in FIG. 6, the movement detecting means 55 comprises a power adjustment knob 6, a photo-interrupter 60 and a slit plate 61. The movement detecting means 55 does not always need to detect the rotation amount of the power adjustment knob 6 and may detect a movement amount of the target 12.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. The lens meter for measuring refractive characteristics of an inspected lens comprising:
a lens holder for holding said inspected lens;
a measurement optical system which includes a target projection optical system having an illumination light source for illuminating a measurement target and projecting an image of said measurement target through said inspected lens, and an observation optical system for observing a projected target image;
target moving means for moving said measurement target so as to measure a refractive power of said inspected lens;
a timer circuit for turning off said illumination light source after a predetermined time has passed since said lens meter has been actuated;
detecting means for detecting whether or not said target moving means moves said measurement target; and
a target signal generating circuit for actuating said timer circuit on the basis of a detected result from said detecting means.

2. The lens meter as claimed in claim 1, wherein said illumination light source is driven by a battery.

3. The lens meter as claimed in claim 1, wherein said detecting means detects an operation of a power adjustment knob which is moved in the optical axis direction of said target moving means.

4. The lens meter as claimed in claim 3, wherein said detecting means comprises position indicating means for indicating a reference position provided on a shaft of said power adjustment knob and means for detecting a movement of said position indicating means.

5. The lens meter as claimed in claim 1, wherein said timer circuit is actuated in response to an on-signal from a power switch and again actuated in response to a trigger signal generated from said trigger signal generating circuit.

6. The lens meter as claimed in claim 1, wherein said target moving means includes a power adjustment knob for moving said measurement target in the optical axis direction and an axis adjustment knob for rotating said measurement target, said power adjustment knob and said axis adjustment knob being made coaxial about a center of rotation.

7. A lens meter for measuring a refractive power of an inspected lens in a condition that said lens meter is placed on a plane, said lens meter comprising:
a lens holder for holding said inspected lens substantially parallel to said plane;
a target projection optical system having illumination optical source and a measurement target, said target projection optical system projecting an image of said measurement target through said inspected lens;
an ocular-type observation optical system having an ocular tube with a downwardly slanted observation optical axis through which an inspector observes said lens holder;
an imaging optical system for imaging said image of said measurement target on a predetermined plane;
movement means for moving said measurement target; and
control means for controlling said illumination optical source including:
a timer circuit for deenergizing said illumination optical source after a predetermined lapse of time,
detecting means for detecting movement of said measurement target due to said movement means, and
a trigger signal generating circuit for actuating said timer circuit based on a detection result by said detecting means.

* * * * *